US007239353B2

(12) United States Patent
Lee et al.

(10) Patent No.: US 7,239,353 B2
(45) Date of Patent: Jul. 3, 2007

(54) IMAGE FORMAT CONVERSION APPARATUS AND METHOD

(75) Inventors: Jong-hwan Lee, Yongin (KR);
You-young Jung, Suwon (KR);
Young-ho Lee, Seoul (KR);
Seung-joon Yang, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 400 days.

(21) Appl. No.: 10/704,663

(22) Filed: Nov. 12, 2003

(65) Prior Publication Data
US 2004/0119883 A1 Jun. 24, 2004

(30) Foreign Application Priority Data
Dec. 20, 2002 (KR) ............... 10-2002-0081642

(51) Int. Cl.
*H04N 7/01* (2006.01)
(52) U.S. Cl. ..................................... 348/441
(58) Field of Classification Search ............. 348/448, 348/459, 441, 558, 452, 453, 456
See application file for complete search history.

(56) References Cited
U.S. PATENT DOCUMENTS

| | | | |
|---|---|---|---|
| 4,731,651 A | | 3/1988 | Matsumoto et al. |
| 5,111,511 A | | 5/1992 | Ishii et al. |
| 5,153,719 A | * | 10/1992 | Ibenthal ............... 348/699 |
| 5,398,071 A | | 3/1995 | Gove et al. |
| 5,400,083 A | | 3/1995 | Mizusawa |
| 5,568,196 A | | 10/1996 | Hamada et al. |
| 5,796,437 A | | 8/1998 | Muraji et al. |
| 5,844,630 A | * | 12/1998 | Yamauchi ............. 348/699 |
| 5,982,444 A | | 11/1999 | Kato et al. |
| 5,995,154 A | | 11/1999 | Heimburger |
| 6,014,182 A | * | 1/2000 | Swartz ................. 348/700 |

(Continued)

FOREIGN PATENT DOCUMENTS

EP        0883298        12/1998

(Continued)

OTHER PUBLICATIONS

U.S. Appl. No. 10/695,169, filed Oct. 29, 2003, You-Young Jung, Samsung Electronics Co., Ltd.

(Continued)

*Primary Examiner*—Paulos Natnael
(74) *Attorney, Agent, or Firm*—Staas & Halsey LLP

(57) ABSTRACT

An image format conversion apparatus including a 3:2 pull-down detection part determining whether a current field out of plural fields continuous in time is an image of a 3:2 pull-down format produced by a 3:2 pull-down process; a scroll text/graphic data detection part determining whether scroll motions exist on the current field; a 3:2 pull-down compensation part calculating interpolation values for pixels of the current field to be interpolated by using a 3:2 pull-down interpolation method; an IPC part calculating interpolation values for pixels of the current field to be interpolated by using a second interpolation method; and an output selection part for selectively outputting either the interpolation values of the 3:2 pull-down compensation part or the interpolation values of the IPC part based on results of the determinations of the scroll text/graphic detection part and the 3:2 pull-down detection part.

18 Claims, 4 Drawing Sheets

U.S. PATENT DOCUMENTS

| | | | |
|---|---|---|---|
| 6,058,140 A | 5/2000 | Smolenski | |
| 6,061,100 A | 5/2000 | Ward et al. | |
| 6,108,041 A * | 8/2000 | Faroudja et al. | 348/446 |
| 6,201,577 B1 * | 3/2001 | Swartz | 348/558 |
| 6,297,848 B1 * | 10/2001 | Westerman | 348/448 |
| 6,370,198 B1 * | 4/2002 | Washino | 375/240.26 |
| 6,559,890 B1 * | 5/2003 | Holland et al. | 348/441 |
| 6,580,463 B2 * | 6/2003 | Swartz | 348/558 |
| 6,700,622 B2 | 3/2004 | Adams et al. | |
| 6,757,022 B2 | 6/2004 | Wredenhagen et al. | |
| 6,837,571 B2 | 5/2005 | Shin | |
| 6,891,571 B2 * | 5/2005 | Shin et al. | 348/448 |
| 6,937,655 B2 * | 8/2005 | De Haan et al. | 375/240.12 |
| 6,989,845 B1 | 1/2006 | Okamoto et al. | |
| 2002/0149703 A1 | 10/2002 | Adams et al. | |
| 2003/0189667 A1 | 10/2003 | Chow | |

FOREIGN PATENT DOCUMENTS

| | | |
|---|---|---|
| EP | 1 091 580 | 4/2001 |
| EP | 1 100 267 | 5/2001 |
| EP | 1 168 842 | 1/2002 |
| EP | 1 198 139 A1 | 4/2002 |
| EP | 1198137 | 4/2002 |
| GB | 2 258 580 | 2/1993 |
| JP | 03-280681 | 12/1991 |
| JP | 04-137892 | 5/1992 |
| JP | 07-288780 | 10/1995 |
| JP | 2001-028735 | 1/2001 |
| JP | 2002-016944 | 1/2002 |
| JP | 2002057993 | 2/2002 |
| KR | 2001-2659 | 1/2001 |
| KR | 2001-90568 | 10/2001 |
| WO | WO 95/24100 | 9/1995 |
| WO | 00/16561 | 3/2000 |
| WO | WO 02/56597 | 7/2002 |

OTHER PUBLICATIONS

U.S. Appl. No. 10/438,210, May 15, 2003, Seung-joon Yang et al., Samsung Electronics Co., Ltd.
European Search Report for European Office Application No. 03026725.6.
Chinese Office Action for Application No. 200310116599.7.
German Office Action for German Application No. 10331048.7.
Translation of JP 2002-016944 (Detailed Description part).
Japanese Office Action for Japanese Application No. 2003-423610.
U.S. Appl. No. 10/714,605, filed Nov. 18, 2003, You-Young Jung, Samsung Electronics Co., Ltd.
U.S. Appl. No. 10/438,210, filed May 15, 2003, Yang et al., Samsung Electronics Co., Ltd.

* cited by examiner

IMAGE FORMAT CONVERSION APPARATUS AND METHOD

CROSS-REFERENCE TO RELATED APPLICATIONS

This application claims the benefit of Korean Application No. 2002-81642, filed Dec. 20, 2002, in the Korean Intellectual Property Office, the disclosure of which is incorporated herein by reference.

BACKGROUND OF THE INVENTION

1. Field of the Invention

The present invention relates to an image format conversion apparatus and method, and, more particularly, to an image format conversion apparatus and method capable of detecting and errorlessly converting horizontally moving text and graphic data of an interlace format contained in images produced in a 3:2 pull-down into images of a progressive format.

2. Description of the Related Art

In general, an image display device employs either the interlace scan mode or the progressive scan mode. The interlace scan mode, which is used for general TVs and the like, divides one image frame into two fields and displays the fields on the screen one after the other in order when displaying one image. At this time, the two fields are referred to as a top field and bottom field, upper field and lower field, odd field or even field, and so on. On the other hand, the progressive scan, or non-interlace scan mode, is used for computer monitors, digital TVs, and so on, and displays the entire frame image at a single time by dealing with one image frame as a frame unit, much like a film is displayed on a screen.

For example, in the case of the 480-line National Television System Committee (NTSC) interlace scan mode (precisely, 487 valid lines in 525 lines), one frame is divided into two 240-line fields for a display, and the 240-line fields divided as such are displayed on a screen one after the other every 1/60 seconds. On the other hand, the progressive scan mode completely displays the entire frame image, a 480-line image, every 1/60 seconds. Accordingly, an image of a progressive format based on the progressive scan mode has a better image quality compared to an image of the interlace format.

One format that is closely related to such a progressive scan mode is a movie produced in film, which is because the original source for almost all recently released DVD movie titles is movies produced in film. Movies are produced at 24 frames per second, which is different from NTSC TV programs. In the case of a DVD movie title, it is, of course, possible to directly manufacture a DVD movie title from original images of 24 frames per second as in an original movie. However, since a majority of image display devices, such as general TVs which are widespread at the present time, adopt the interlace scan mode, DVD movie titles are practically produced in the interlace scan mode, considering such a reality.

Accordingly, a process is required for converting a 24-frame progressive film into 60-field interlace images, which is referred to as the 3:2 pull-down, or the telecine. The 3:2 pull-down process is a process that converts two 24 Hz frames into five 60 Hz fields.

FIG. 1 is a view explaining the 3:2 pull-down process. In FIG. 1, images produced at 24 frames per second in the progressive format are converted into 60 Hz interlace images. That is, as shown in FIG. 1, three fields are produced from the first frame Frame1, two fields are produced from the second frame Frame2, and so on, so five fields are produced per two frames on the whole.

However, since the data exchanges among devices using different scan modes become more necessary than ever as image display devices employing the progressive scan mode increase, an interlaced-to-progressive conversion (IPC) method becomes necessary to convert the interlace scan mode into the progressive scan mode. During such an IPC process, if it is known that a field to be interpolated is for an image of the 3:2 pull-down format, which is produced in 3:2 pull-down interpolation, a complete image of the progressive format before the 3:2 pull-down interpolation can be easily obtained by combining fields of the interlace format. Accordingly, before implementing the IPC method, it becomes necessary to detect whether a field to be interpolated is for an image interpolated in the 3:2 pull-down format. Various conventional methods exist for detecting such images of the 3:2 pull-down format.

However, horizontally scrolling interlaced text, or graphic data such as caption, and so on, may be included in an image of the 3:2 pull-down format. In this case, if the progressive images prior to the 3:2 pull-down interpolation are reproduced by simply combining the interlaced fields without considering scrolling text or graphic data, the text or the like is not smoothly displayed in the interpolated images, and, in worse cases, the broken text is displayed.

Therefore, in the case that an input image is in the 3:2 pull-down format, it is necessary to have an image format conversion apparatus and method capable of detecting whether scroll motions exist on horizontally scrolling interlaced text or graphic data prior to the interpolation, and adaptively interpolating the images accordingly.

SUMMARY OF THE INVENTION

The present invention has been devised to solve the above and/or other problems, so it is an aspect of the present invention to provide an image format conversion apparatus and method of selecting an adaptive interpolation process and errorlessly converting an input image into the progressive format depending upon whether the image is produced in 3:2 pull-down and whether horizontally moving interlaced text or graphic data exists in the image.

Additional aspects and/or advantages of the invention will be set forth in part in the description which follows and, in part, will be obvious from the description, or may be learned by practice of the invention.

In order to achieve the above and/or other aspects, an image format conversion apparatus according to the present invention comprises a 3:2 pull-down detection part determining whether a current field out of plural fields continuous in time is an image of a 3:2 pull-down format produced by a 3:2 pull-down process; a scroll text/graphic data detection part determining whether scroll motions exist on the current field; a 3:2 pull-down compensation part calculating interpolation values for pixels of the current field to be interpolated by using a 3:2 pull-down interpolation method; an IPC part calculating interpolation values for pixels of the current field to be interpolated by using a second interpolation method; and an output selection part for selectively outputting either the interpolation values of the 3:2 pull-down compensation part or the interpolation values of the IPC part based on results of the determinations of the scroll text/graphic detection part and the 3:2 pull-down detection part.

The output selection part may include an output part selectively outputting either the interpolation values of the 3:2 pull-down compensation part or the interpolation values of the IPC part; and a conversion process selection part controlling an output of the output part based on the results of the determinations of the scroll text/graphic detection part and the 3:2 pull-down detection part.

The conversion process selection part may control the output part to output the interpolation values of the IPC part in response to the current field being determined to be in the 3:2 pull-down format and the scroll motions exist on the current field, and controls the output part to output the interpolation values of the 3:2 pull-down compensation part in response to the scroll motions not existing in the current field. Further, the conversion process selection part may control the output part to output the interpolation values of the IPC part in response to the current field not being in the 3:2 pull-down format.

The scroll text/graphic detection part may include a scroll detection unit determining whether the scroll motions exist on the current field; a scroll line detection unit calculating scroll motion information indicating whether the scroll motions exist by line in a predetermined search region in response to the scroll motions being detected by the scroll detection part; a scroll flag buffer storing the scroll motion information by line; and a multiplexer selectively outputting any one piece of the scroll motion information stored by line in the scroll flag buffer.

The scroll text/graphic detection part may determine whether the scroll motions exist with reference to the current field and fields ahead of and behind the current field. Further, the scroll line detection unit may calculate the scroll motion information with reference to fields selected according to a predetermined period based on a 3:2 pull-down.

Further, the 3:2 pull-down detection unit may compare field motion information calculated in a field unit and a field pattern having a certain period based on the 3:2 pull-down to determine whether the image is in the 3:2 pull-down format.

An image format conversion method comprises determining whether a current field out of plural fields continuous in time is an image of a 3:2 pull-down format produced by a 3:2 pull-down process; determining whether scroll motions exist on the current field; calculating interpolation values for pixels of the current field to be interpolated by using a 3:2 pull-down interpolation method; calculating interpolation values for pixels of the current field to be interpolated by using a second interpolation method; and selectively outputting either the interpolation values of the 3:2 pull-down interpolation method or the second interpolation method based on the determinations of whether the current field is an image of the 3:2 pull-down format and whether the scroll motions exist on the current field.

The selective output of the interpolation values may output the interpolation values calculated in the second interpolation method in response to the current field being in the 3:2 pull-down format and the scroll motions existing on the current field, and may output the interpolation values calculated in the 3:2 pull-down interpolation method in response to the scroll motions not existing on the current field. Further, the selective output of the interpolation values may output the interpolation values calculated in the second interpolation method in response to the current field not being in the 3:2 pull-down format.

The determining whether scroll motions exist on the current field may further comprise calculating scroll motion information indicating whether the scroll motions exist by line in a predetermined search region in response to the scroll motions existing; storing the scroll motion information by line; and selectively outputting any one piece of the scroll motion information stored by line.

The determining whether scroll motions exist on the current field may comprise detecting the scroll motions with reference to the current field and fields ahead of and behind the current field. Further, the calculating scroll information by line comprises calculating the scroll motion information with reference to fields selected according to a predetermined period based on the 3:2 pull-down format.

The determining whether a current field out of plural fields continuous in time is an image of a 3:2 pull-down format produced by a 3:2 pull-down process may comprise comparing field motion information calculated by a field unit and a field pattern having a certain period based on the 3:2 pull-down format.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
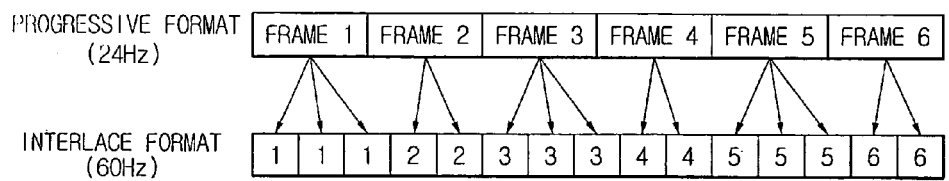
FIG. 1 is a view illustrating a 3:2 pull-down process.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
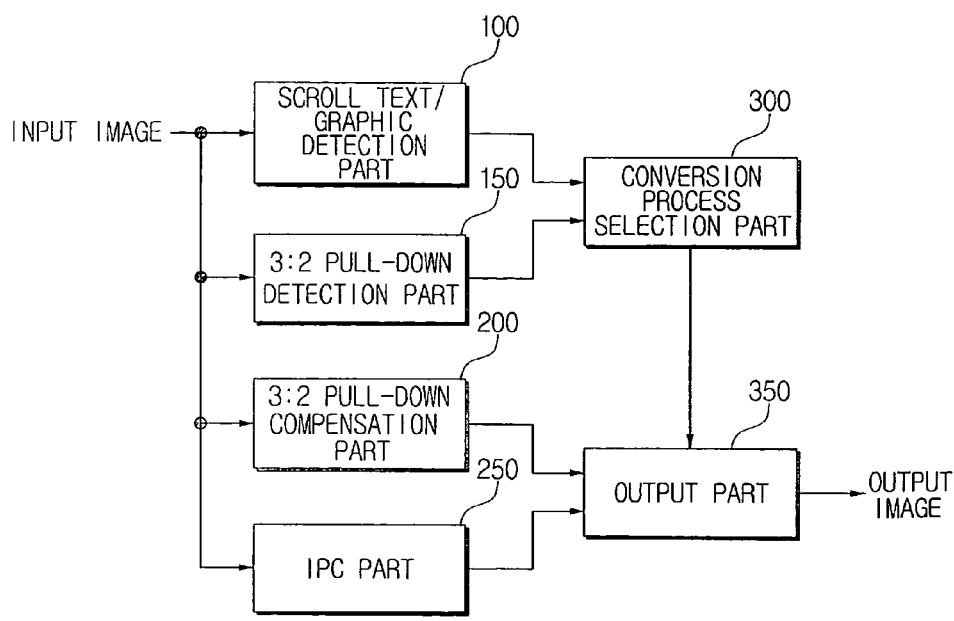
FIG. 2 is a block diagram of an image format conversion apparatus according to an embodiment of the present invention.

FIG. 2 is a block diagram showing an image format conversion apparatus according to an embodiment of the present invention. The image format conversion apparatus is constructed with a scroll text/graphic detection part 100, a 3:2 pull-down detection part 150, a 3:2 pull-down compensation part 200, an IPC part 250, a conversion process selection part 300, and an output part 350.

An input image of the interlace format for interpolation is inputted to the scroll text/graphic detection part 100, 3:2 pull-down detection part 150, 3:2 pull-down compensation part 200, and IPC part 250, and the input image includes plural fields continued in time. At this time, a field to be currently interpolated is referred to as a current field, and fields ahead of and behind the current field in time are referred to as a previous field and a next field, respectively. The previous and next fields each become a reference field with respect to the current field.

The scroll text/graphic detection part 100 determines line by line whether a scroll motion exists on horizontally scrolling interlaced text, or graphic data, and so on, in the current field with reference to the current field and a reference field.

The 3:2 pull-down detection part 150 detects whether an input image is an image of the 3:2 pull-down format, which is produced by the 3:2 pull-down method. The 3:2 pull-down compensation part 200 calculates interpolation values for pixels to be interpolated according to the 3:2 pull-down interpolation process. The IPC part 250 calculates interpolation values for pixels to be interpolated in the current field by using an appropriate compensation method such as the motion-compensated interpolation method, the motion-adaptive interpolation method, or the like.

The output part 350 selectively outputs the 3:2 pull-down compensation part 200 or the IPC part 250. The conversion process selection part 300 controls an output selection of the output part 350 with reference to a result of the decision of the scroll text/graphic detection part 100 and the 3:2 pull-down detection part 150. An output image outputted from the output part 350 becomes a final interpolation value.

Figure 3:
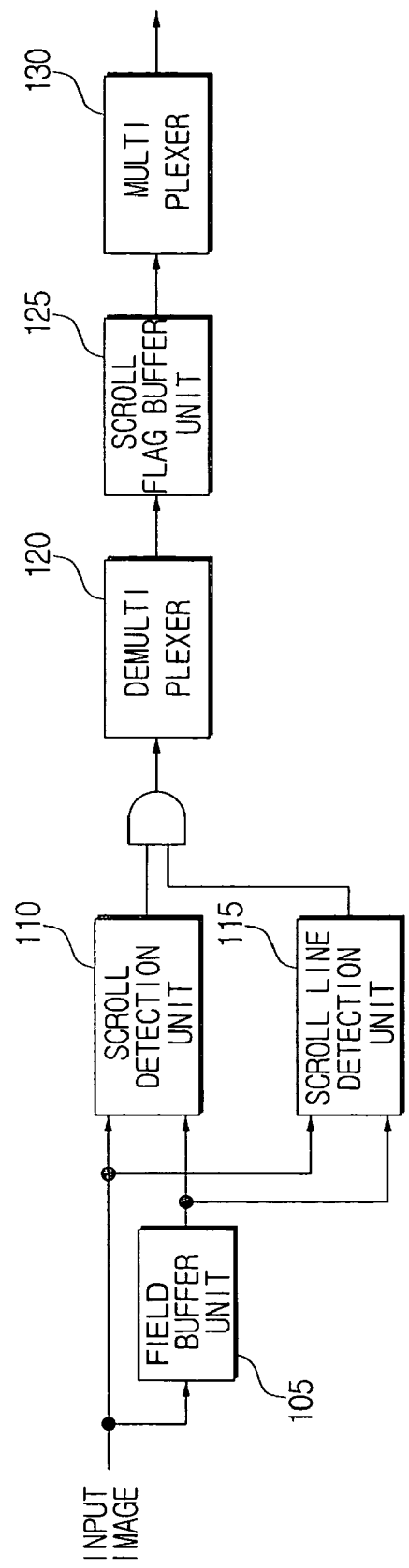
FIG. 3 is a block diagram showing in detail a scroll text/graphic detection unit of FIG. 2.

FIG. 3 is a block diagram showing in detail the scroll text/graphic detection part 100 of FIG. 2.

Referring to FIG. 3, the scroll text/graphic detection part 100 has a field buffer unit 105, a scroll detection unit 110, a scroll line detection unit 115, a demultiplexer 120, a scroll flag buffer unit 125, and a multiplexer 130.

The field buffer unit 105 sequentially buffers input image fields in the input order and provides the fields to the scroll detection unit 110 and the scroll line detection unit 115. Accordingly, the scroll detection unit 110 and the scroll line detection unit 115 simultaneously refer to a previous field, a current field, and a next field using the currently input field and the fields stored in the field buffer unit 105.

The scroll detection unit 110 determines whether scroll motions exist on horizontally scrolling text, graphic data, and so on with reference to a current field and a previous field stored in the field buffer unit 105.

If the scroll detection unit 110 determines that scroll motions exist on the current field, the scroll line detection unit 115 determines whether scroll motions exist line by line in a certain search region. Since the scrolling text or graphic data is generally displayed on the lower portion of an image, a detection speed can be enhanced by suitably setting a search region instead of detecting scroll motions over an entire field.

The scroll flag buffer unit 125 stores line by line scroll motion information indicating whether scroll motions exist with respect to individual lines. At this time, the demultiplexer 120 stores a scroll motion at a position assigned to each line in the scroll flag buffer unit 125, and the multiplexer 130 reads out and externally outputs the scroll motion information stored at a corresponding position of the scroll flag buffer unit 125 based on externally inputted information.

Figure 4:
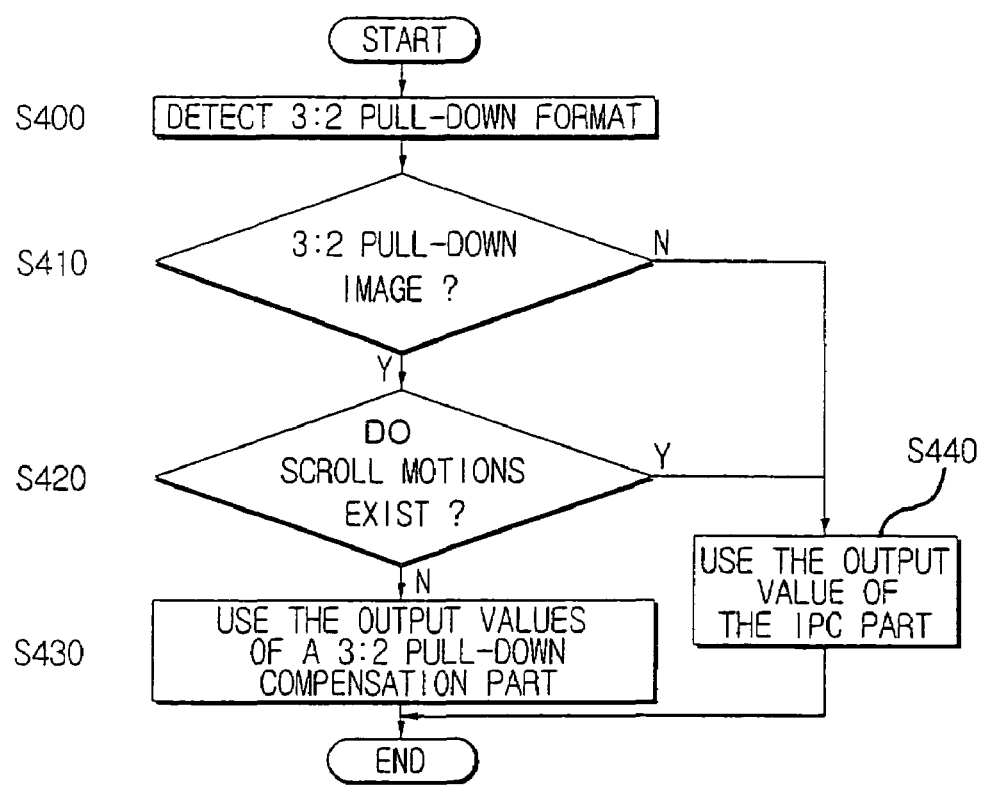
FIG. 4 is a flow chart illustrating an operation process of the image format conversion apparatus according to an embodiment of the present invention.

FIG. 4 is a flow chart illustrating an image format conversion method according to an embodiment of the present invention. In FIG. 4, the 3:2 pull-down detection unit 150 detects whether an input image is an image of the 3:2 pull-down format which is produced by the 3:2 pull-down process (S400). It can be detected whether an image is in 3:2 pull-down format when monitoring a variation period of summed absolute difference (SAD) values and the like with respect to each field. The 3:2 pull-down format detection method is described in detail in Applicant's Republic of Korea Patent Application No. 2002-41021, entitled "Film Mode Detection Apparatus And Method For Image Signals", which is incorporated as part of the present invention for reference.

If the input image is not in 3:2 pull-down format as a result of the detection of the 3:2 pull-down detection unit 150, the interpolation values calculated in the IPC part 250 are used (S410 and S440).

Figure 5:
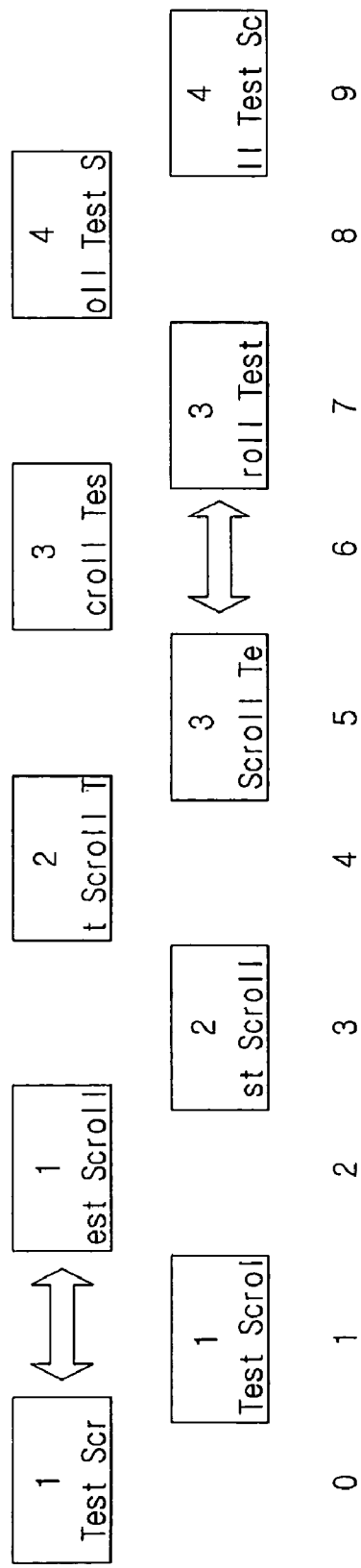
FIG. 5 is a view illustrating operations of an image format conversion apparatus according to an embodiment of the present invention.

But, on the contrary, if an input image is in the 3:2 pull-down format, the scroll text/graphic detection part 100 determines whether scroll motions exist on horizontally scrolling text, graphic data, and so on, in the current field (S420). In this case, as shown in FIG. 5, a precise decision can be made when scroll motions are detected by using fields produced from the same frame, such as, for example, fields numbered 0 and 2 or fields numbered 5 and 7. To do so, corresponding fields out of the fields sequentially stored in the field buffer unit 105 are controlled to be outputted to the scroll detection unit 110 and the scroll line detection unit 115.

Interpolation values of the IPC unit 250 are used if scroll motions are detected by the scroll text/graphic detection unit 100 (S440), and output values of the 3:2 pull-down compensation part 200 are used as interpolation values in the case that scroll motions do not exist (S430).

The method for detecting whether scroll motions exist or whether a scroll motion exists in each line is described in detail in Applicant's Republic of Korea Patent Application No. 2002-74277, entitled "Motion Detection Apparatus And Method", which is incorporated as part of the present invention for reference.

By the above method, appropriate interpolation values are used to be adaptively interpolated according to whether an input image is in 3:2 pull-down format and whether horizontally moving interlaced text or graphic data exists in the case of the 3:2 pull-down format, to thereby prevent scrolling text or graphic data from being broken on an interpolated image.

As described above, in the case that horizontally moving interlaced text or graphic data exists on an image of 3:2 pull-down format, the present invention detects the text or graphic data, enabling good-quality images of progressive format to be obtained without errors.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image format conversion apparatus, comprising:
    a 3:2 pull-down detection part determining whether a current field out of plural fields continuous in time is an image of a 3:2 pull-down format produced by a 3:2 pull-down process;
    a scroll text/graphic data detection part determining whether scroll motions exist on the current field;
    a 3:2 pull-down compensation part calculating interpolation values for pixels of the current field to be interpolated by using a 3:2 pull-down interpolation method;
    an IPC part calculating interpolation values for pixels of the current field to be interpolated by using a second interpolation method; and
    an output selection part selectively outputting either the interpolation values of the 3:2 pull-down compensation part or the interpolation values of the IPC part based on results of the determinations of the scroll text/graphic data detection part and the 3:2 pull-down detection part.

2. The image format conversion apparatus as claimed in claim 1, wherein the output selection part comprises:
an output part selectively outputting either the interpolation values of the 3:2 pull-down compensation part or the interpolation values of the IPC part; and
a conversion process selection part controlling an output of the output part based on the results of the determinations of the scroll text/graphic detection part and the 3:2 pull-down detection part.

3. The image format conversion apparatus as claimed in claim 2, wherein the conversion process selection part controls the output part to output the interpolation values of the IPC part in response to the current field being determined to be in the 3:2 pull-down format and the scroll motions exist on the current field, and controls the output part to output the interpolation values of the 3:2 pull-down compensation part in response to the scroll motions not existing in the current field.

4. The image format conversion apparatus as claimed in claim 2, wherein the conversion process selection part controls the output part to output the interpolation values of the IPC part in response to the current field not being in the 3:2 pull-down format.

5. The image format conversion apparatus as claimed in claim 1, wherein the scroll text/graphic detection part comprises:
a scroll detection unit determining whether the scroll motions exist on the current field;
a scroll line detection unit calculating scroll motion information indicating whether the scroll motions exist line by line in a predetermined search region in response to the scroll motions being detected by the scroll detection part;
a scroll flag buffer storing the scroll motion information by line; and
a multiplexer selectively outputting any one piece of the scroll motion information stored by line in the scroll flag buffer.

6. The image format conversion apparatus as claimed in claim 5, wherein the scroll text/graphic detection part determines whether the scroll motions exist with reference to the current field and fields ahead of and behind the current field.

7. The image format conversion apparatus as claimed in claim 5, wherein the scroll line detection unit calculates the scroll motion information with reference to fields selected according to a predetermined period based on a 3:2 pull-down.

8. The image format conversion apparatus as claimed in claim 5, wherein the scroll line detection unit further comprises a field buffer unit sequentially buffering input image fields in input order, and providing the buffered fields to the scroll detection unit and the scroll line detection unit.

9. The image format conversion apparatus as claimed in claim 1, wherein the 3:2 pull-down detection unit compares field motion information calculated in a field unit and a field pattern having a certain period based on the 3:2 pull-down to determine whether the image is in the 3:2 pull-down format.

10. The image format conversion apparatus as claimed in claim 1, wherein the second interpolation method used by the IPC part is a motion-compensated interpolation method.

11. The image format conversion apparatus as claimed in claim 1, wherein the second interpolation method used by the IPC part is a motion-adaptive interpolation method.

12. An image format conversion method, the method comprising:
determining whether a current field out of plural fields continuous in time is an image of a 3:2 pull-down format produced by a 3:2 pull-down process;
determining whether scroll motions exist on the current field;
calculating interpolation values for pixels of the current field to be interpolated by using a 3:2 pull-down interpolation method;
calculating interpolation values for pixels of the current field to be interpolated by using a second interpolation method; and
selectively outputting either the interpolation values of the 3:2 pull-down interpolation method or the second interpolation method based on the determinations of whether the current field is an image of the 3:2 pull-down format and whether the scroll motions exist on the current field.

13. The image format conversion method as claimed in claim 12, wherein the selective output of the interpolation values outputs the interpolation values calculated in the second interpolation method in response to the current field being in the 3:2 pull-down format and the scroll motions existing on the current field, and outputs the interpolation values calculated in the 3:2 pull-down interpolation method in response to the scroll motions not existing on the current field.

14. The image format conversion method as claimed in claim 12, wherein the selective output of the interpolation values outputs the interpolation values calculated in the second interpolation method in response to the current field not being in the 3:2 pull-down format.

15. The image format conversion method as claimed in claim 12, wherein the determining whether scroll motions exist on the current field further comprises:
calculating scroll motion information indicating whether the scroll motions exist by line in a predetermined search region in response to the scroll motions existing;
storing the scroll motion information by line; and
selectively outputting any one piece of the scroll motion information stored by line.

16. The image format conversion method as claimed in claim 15, wherein the determining whether scroll motions exist on the current field comprises detecting the scroll motions with reference to the current field and fields ahead of and behind the current field.

17. The image format conversion method as claimed in claim 15, wherein the calculating scroll information by line comprises calculating the scroll motion information with reference to fields selected according to a predetermined period based on the 3:2 pull-down format.

18. The image format conversion method as claimed in claim 12, wherein the determining whether a current field out of plural fields continuous in time is an image of a 3:2 pull-down format produced by a 3:2 pull-down process comprises comparing field motion information calculated in a field unit and a field pattern having a certain period based on the 3:2 pull-down format.

* * * * *